Jan. 13, 1925.

P. W. DAVIS ET AL 1,523,057

HARVESTER

Filed Jan. 17, 1923

Patented Jan. 13, 1925.

1,523,057

UNITED STATES PATENT OFFICE.

PAUL W. DAVIS AND DONA M. DAVIS, OF HOOKER, OKLAHOMA.

HARVESTER.

Application filed January 17, 1923. Serial No. 613,233.

*To all whom it may concern:*

Be it known that we, PAUL W. DAVIS and DONA M. DAVIS, citizens of the United States of America, and residents of Hooker, in the county of Texas and State of Oklahoma, have invented certain new and useful Improvements in Harvesters, of which the following is a specification.

This invention relates to harvesting machinery, and particularly to a device intended for use in connection with harvesting machines to make them better adapted for cutting milo maize, and an object of this invention is to provide novel means for guiding the stalks to the cutter and for inclining the stalks slightly during the cutting action.

The invention furthermore has for an object the provision of a guard at each end of the cutter, effective to prevent grain from being lost at the ends of the header.

It is a further object of this invention to provide the gathering fingers with tines, and preferably the alternate fingers are provided with tines near the ends, whereas the other fingers are provided with tines at points about half way between the two ends of the guard, although the proportions in this respect may be changed to suit particular requirements, and the inventors do not wish to be limited with respect thereto.

It is a further object of this invention to produce fingers having braces, with novel means for securing the braces in place, the whole constituting an improvement on the harvester invented by us and which forms the subject of a Patent No. 1,443,872, dated Jan. 30, 1923.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
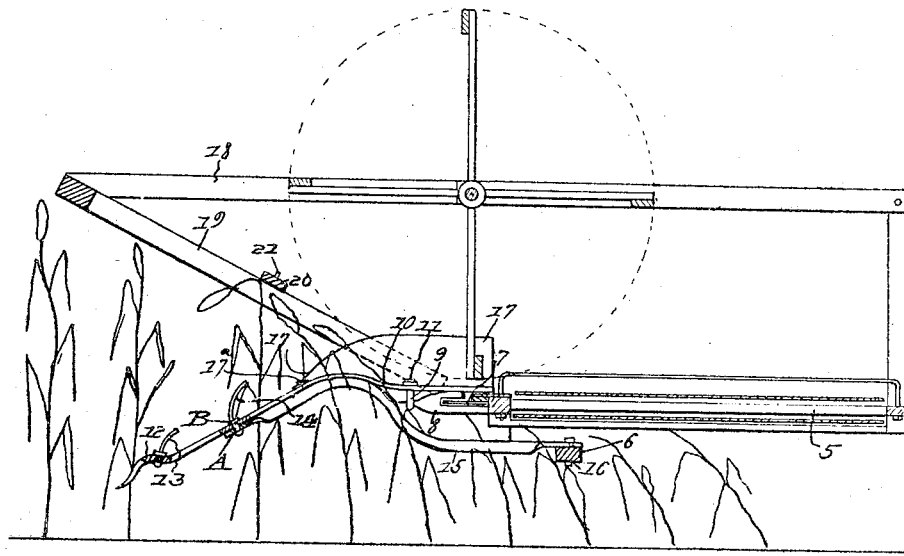
Figure 2:
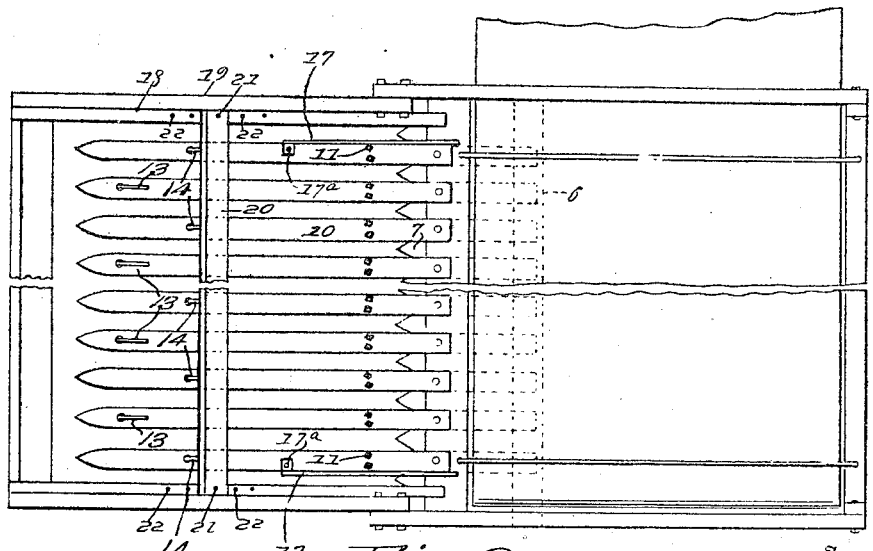

Figure 1 illustrates a longitudinal sectional view of a header platform with devices embodying the invention applied thereto; and Figure 2 illustrates a top plan view thereof.

In these drawings, 5 denotes the platform having preferably a wooden bar 6 secured underneath the header platform and extending approximately the full width of the said platform. The cutter 7 is associated with guard fingers 8 having reduced forward ends which fit in eyes 9, the said eyes being anchored to the guiding auxiliary fingers 10 in any suitable manner, as by riveting. Each guiding auxiliary finger has its inner end secured in correlated position to the cutter in order that the vegetation guided by the guiding auxiliary finger may be directed to the cutter. The guiding auxiliary fingers are of irregular contour in that they extend approximately horizontally for a distance from the cutter and are then curved upwardly and rather abruptly dropped at their forward ends so that they will engage the stalks relatively close to the ground.

The guiding auxiliary fingers have upwardly curved portions or humps 12 near their outer ends and alternate guiding auxiliary fingers have tines 13 attached to them at or about the location of the said humps. The other guiding auxiliary fingers of the series have tines 14 that are positioned well rearwardly of the forward ends of the guiding auxiliary fingers and the said tines have shanks A that pass through the guiding auxiliary fingers and the braces 15 whereby the braces are anchored to the guiding auxiliary fingers. Each tine furthermore has a shoulder B that rests on a finger and the end of the shank that is extended through the brace is upset to form an anchorage. The braces may be of any appropriate contour, and the inventors do not wish to be limited in this respect, nor to the manner of anchoring the said braces, but in the present embodiment of the invention, the braces are attached to the bar 6 by fastenings 16, which may be in the nature of bolts, screws or the like, according to the wishes of the manufacturer.

In operation, the tines of the invention serve to retain or arrest heads of grain that have been cut from the stalks and in some manner have escaped the reel, the said tines serving to retain the stray heads momentarily until other heads pass between the fingers and carry the stray heads rearwardly onto the canvas.

The position of the brace is such that the pressure of the guiding auxiliary finger on it is nearly in a line with the length of the said brace, and therefore, it will serve to hold the guiding auxiliary finger rigid and prevent undue vibration of the same during the travel of the harvester over uneven surfaces.

The plates 17 constituting guards, one of which is at each end of the cutter bar, and which are designed to prevent the loss or escape of grain at the sides are preferably made of sheet metal, and the outer edge of each rests against the divide board of the header, and each guard is secured to one of the outside fingers in any suitable manner, as by rivets 17<sup>a</sup>.

The extension frame 18 and the diagonal guides 19 are provided, and the diagonal guides are connected by a cross bar 20 which is attached to the guides by fastenings 21 such as pins, bolts or the like, which may be inserted in the apertures 22, and therefore, the cross bar may be adjusted to different positions to operate properly in conjunction with grain of different heights.

We claim:

1. In a harvester, a header platform, a cutter, guiding auxiliary fingers having their inner ends secured in positions near the cutter, the said guiding auxiliary fingers extending outwardly and having depending outer ends, guard fingers, means for anchoring the guiding auxiliary fingers to the guard fingers, braces having their outer ends secured to the guiding auxiliary fingers, means for anchoring the inner ends of the braces to the header platform, tines on the said guiding auxiliary fingers and projecting thereabove, the tines being located near the outer ends of the alternate guiding auxiliary fingers and at positions more remote from the forward ends of the said guiding auxiliary fingers on those remaining.

2. In a harvester, a header platform, a cutter, guiding auxiliary fingers having their inner ends secured in positions near the cutter, the said guiding auxiliary fingers extending outwardly and having depending outer ends, guard fingers, means for anchoring the guiding auxiliary fingers to the guard fingers, braces having their outer ends secured to the guiding auxiliary fingers, means for anchoring the inner ends of the braces to the header platform, tines on the said guiding auxiliary fingers and projecting thereabove, the tines being located near the outer ends of the alternate guiding auxiliary fingers and at positions more remote from the forward ends of the said guiding auxiliary fingers on those remaining, and plates at the ends of the cutter for preventing the escape of grain from the header.

PAUL W. DAVIS.
DONA M. DAVIS.